United States Patent
Brunson et al.

(10) Patent No.: US 8,423,629 B2
(45) Date of Patent: Apr. 16, 2013

(54) NETWORK FRAMEWORK ASSOCIATING NON-ENTERPRISE PHONE WITH ENTERPRISE USERS

(75) Inventors: Gordon R. Brunson, Broomfield, CO (US); Harsh V. Mendiratta, Old Bridge, NJ (US); Chandra Ravipati, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 434 days.

(21) Appl. No.: 12/701,165

(22) Filed: Feb. 5, 2010

(65) Prior Publication Data

US 2011/0066707 A1  Mar. 17, 2011

Related U.S. Application Data (60) Provisional application No. 61/242,881, filed on Sep. 16, 2009.

(51) Int. Cl.
*G06F 15/177* (2006.01)

(52) U.S. Cl.
USPC ............................................. 709/221; 709/238

(58) Field of Classification Search ............... 709/203, 709/221
See application file for complete search history.

(56) References Cited

U.S. PATENT DOCUMENTS

| 7,408,925 | B1 | 8/2008 | Boyle et al. |
| 2008/0301787 | A1 | 12/2008 | Lindholm et al. |
| 2009/0164556 | A1* | 6/2009 | Siegel et al. ................. 709/203 |

FOREIGN PATENT DOCUMENTS

WO  WO 2009/016967  2/2009

OTHER PUBLICATIONS

Official Action including English translation of Korea Patent Application No. 2010-0091262, dated Aug. 1, 2011 7 pages.
U.S. Appl. No. 12/701,168, filed Feb. 5, 2010, Chavez et al.
Extended European Search Report for European Patent Application No. 10175947.0, dated Dec. 22, 2010.
Background of the Invention for the above-captioned invention filed Feb. 5, 2010 (previously provided).
Boyle et al., U.S. Appl. No. 12/493,031, Entitled "Internal/External Network Identifier", filed Jun. 26, 2009, 24 pages.
Tango Networks, "Any Phone, One Solution. Let's Tango", available at www.tango-networks.com, Tango Networks, Inc., 2009-2010, 2 pages.

* cited by examiner

*Primary Examiner* — Yves Dalencourt
(74) *Attorney, Agent, or Firm* — Sheridan Ross P.C.

(57) ABSTRACT

Methods, devices, and systems are provided for identifying unique points in communication processing for substituting and restoring identities associated with the communication. These specific replacements facilitate communication requests to-and-from external identities to be treated similar to communication requests to-and-from enterprise users, thereby allowing enterprise users to access enterprise-based communication preferences and services via non-enterprise devices.

17 Claims, 3 Drawing Sheets

NETWORK FRAMEWORK ASSOCIATING NON-ENTERPRISE PHONE WITH ENTERPRISE USERS

CROSS-REFERENCE TO RELATED APPLICATIONS

This application claims the benefit of U.S. Provisional Patent Application Ser. No. 61/242,881, filed Sep. 16, 2009, the entire disclosure of which is hereby incorporated herein by reference.

FIELD OF THE INVENTION

The invention relates generally to communications and more specifically to user mapping across network boundaries.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Problematically, however, a user's identity in one network may not be ubiquitous across other networks. For example, a user may have an enterprise identity that is used by the enterprise network to (1) identify the user, (2) identify communication preferences of the user, and (3) extend communication services to the user in accordance with their communication preferences. Unfortunately, if the user does not access the network with their enterprise identity (e.g., via an enterprise device), then the network may be incapable of properly identifying the user and providing the desired communication features to the user. This can create frustrations for the user, especially if the user is working remotely and cannot immediately access an enterprise device but desires access to enterprise communication services.

"Mobile twinning" or "Extension to Cellular" (EC) is but one example of a productivity feature offered by enterprise call controllers. This feature allows external phones (mobile and home) to be twinned (associated) with the office phone numbers. Currently, the enterprise features are extended to the twinned external phones by loosely coupling external numbers (off-PBX telephone numbers) with the enterprise numbers. The implementation of this feature is based on the premise that a single call controller is the sole controller of the features and no other application needs to associate them. In an architecture where the application control is distributed across multiple application servers, the communication infrastructure may invoke more than one application in a sequence to act on a single session request. However, unless these applications are modified to be made aware of the association, they will not be able to invoke the correct feature logic (i.e., provide the desired services). Therefore, the existing solution, where a single application supports the association between the enterprise user's internal and external extensions and the other applications are not aware of this association, does not work well in distributed application architectures.

SUMMARY

Avaya and other PBX vendors have solved this issue by building custom extensions to the core functionality of the call controllers and developing proprietary interfaces for the interfacing applications. The industry implementations can be summarized into following two broad categories/patterns: (1) Fixed Mobile Convergence (FMC) and (2) IP Multimedia Services (IMS) alias.

With FMC, users get uninterrupted communication service from mobile and VoIP service providers using a single device. The calls are anchored through an application server that maintains the mapping of different identifier and switches calls between mobile and VoIP networks based upon the signal strength of the device. When used in an enterprise network, other communication applications are not aware of the mapping and cannot associate mobile identifiers with the enterprise identifiers. To influence and participate in the call processing of FMC users, these applications are required to build custom interfaces and integration with the anchor application server. As can be appreciated by those skilled in the art, this is a costly and time-consuming requirement.

The IMS introduces a concept of a user profile to associate different identities (i.e., public identifiers) together. The user profile can be accessed using any of the public identifiers or a common identifier (i.e., converged identifier). When a communication request is originated from or targeted at one of the associated identities, the core network infrastructure and applications access the user information using the user profile that can be accessed using any of the identifiers. This approach, however, requires broad level changes across core infrastructure, applications, and provisioning system to support IMS alias. The legacy and current products that do not understand the concept of IMS user profiled do not benefit from this approach.

In a majority of the current implementations, a single application is generally responsible for associating the enterprise user identity with the external identities. This type of approach introduces issues whenever a new independent application is built whose logic is dependent upon the identities association. Lack of a network wide framework associating external identities with the enterprise users results in custom code and potentially new interfaces development. This approach is not only inefficient and time-consuming but is also quite expensive.

As noted above, other approaches, like IMS alias, require an overhaul of the identity subsystem (e.g., across infrastructure, applications and provision systems). It does not suit the needs of the networks with significant investments in legacy infrastructure.

It is, therefore, one aspect of the present invention to provide a solution which facilitates an association of external identities with enterprise identities, particularly where a distributed application architecture is implemented.

In accordance with at least some embodiments of the present invention, a method, device, and system are provided with facilitate the calls to-and-from external identities to be treated similar to calls for enterprise identities. Embodiments of the present invention also allow the legacy and existing applications to work without substantial and costly changes.

It is one aspect of the preset invention to provide a non-enterprise identity table that associates external identities of the enterprise users with their enterprise identities.

It is another aspect of the present invention to leverage the non-enterprise identity table during communication request processing such that the caller's external identity can be substituted with the caller's enterprise identity (e.g., using a non-enterprise identity table lookup function).

It is another aspect of the present invention to insert the original identity(ies) of the caller somewhere in the request (i.e., in a request packet header).

It is another aspect of the present invention to route the request to the caller's authoritative proxy for origination processing (aka orig-side feature invocation), thereby allowing the caller to access communication features defined in the caller's enterprise profile (i.e., a communication profile containing communication preferences and rules for the caller which is maintained in the enterprise and not shared without outside networks absent unique circumstances). After origination processing, the request may be routed to the callee's authoritative proxy for terminal processing (aka term-side feature invocation).

It is another aspect of the present invention to, after invoking orig-side processing, substitute the callee's external identity with the callee's enterprise identity (e.g., using a non-enterprise identity table lookup function).

It is another aspect of the present invention to route the request to the callee's authoritative proxy for term-side feature invocation.

It is another aspect of the present invention to restore the original external identity of the callee (e.g., using a non-enterprise identity table lookup function) and then route the request to an external gateway/trunk for terminating the call at the external identity.

In accordance with at least some embodiments of the present invention, a method is provided that generally comprises:

receiving a communication request at a network boundary device of a first network;

determining a first identity of a first user identified in the communication request; and mapping the first identity of the first user to a second identity of the first user, wherein mapping comprises altering the communication request to identify the first user by the second identity.

In some embodiments, the first identity may be a non-enterprise identity and the second identity may be an enterprise identity. This usually applies to communication requests that are inbound to an enterprise network. In other embodiments, the first identity may be an enterprise identity and the second identity may be a non-enterprise identity. This usually applies to communication requests that are outbound from an enterprise network.

The mapping of user identities is particularly helpful in providing enterprise users access to their enterprise-based communication preferences even though the enterprise user may be utilizing a non-enterprise communication device. In other words, once the network boundary device has mapped a user's non-enterprise identity to an enterprise identity with the identity mapping module for a particular communication request, that communication request can be treated as if it was originated by or targeted to an enterprise device even though that may not be the case. As the communication request traverses the network to one or more applications there is no need for each application to map the identity of the user back to an enterprise identity. In other words, all processing within the enterprise network can benefit from the identity mapping which occurs at the network boundary or some other network device.

For calls originating from the enterprise network, after the origination processing the called party identity is replaced in the core of the network. For calls originating from outside of the enterprise network, the identity of called or calling parties can be replaced at the network boundary. In either situation, the request is then forwarded to the authoritative server of the term party. After the term side processing, during the contact resolution, the original called party is restored.

In some embodiments of the present invention, identity mapping may also include mapping one network identity to another network identity, where both identities are not enterprise identities. In such an embodiment, a call may be received as having a first non-enterprise identity. This first non-enterprise identity may be mapped to an enterprise identity for the same user. If, however, the call is then forwarded back outside of the enterprise network, it may be possible to map the enterprise identity of the user to another different non-enterprise identity to facilitate efficient communications with the called party. Thus, it may be possible to include some type of network identifier in the caller identifier field of a call or communication request.

As used herein, the term "communication request" can include any type of communication session-initiating message or group of messages. Exemplary communication requests can include, but are not limited to, a SIP INVITE, a call setup message, a video call setup message, a first Instant Message, a resource reservation message, or any other type of message used to initiate or setup a communication session in any type of known medium or media (e.g., voice, video, text, email, IM, etc.).

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to associate identities across network boundaries.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
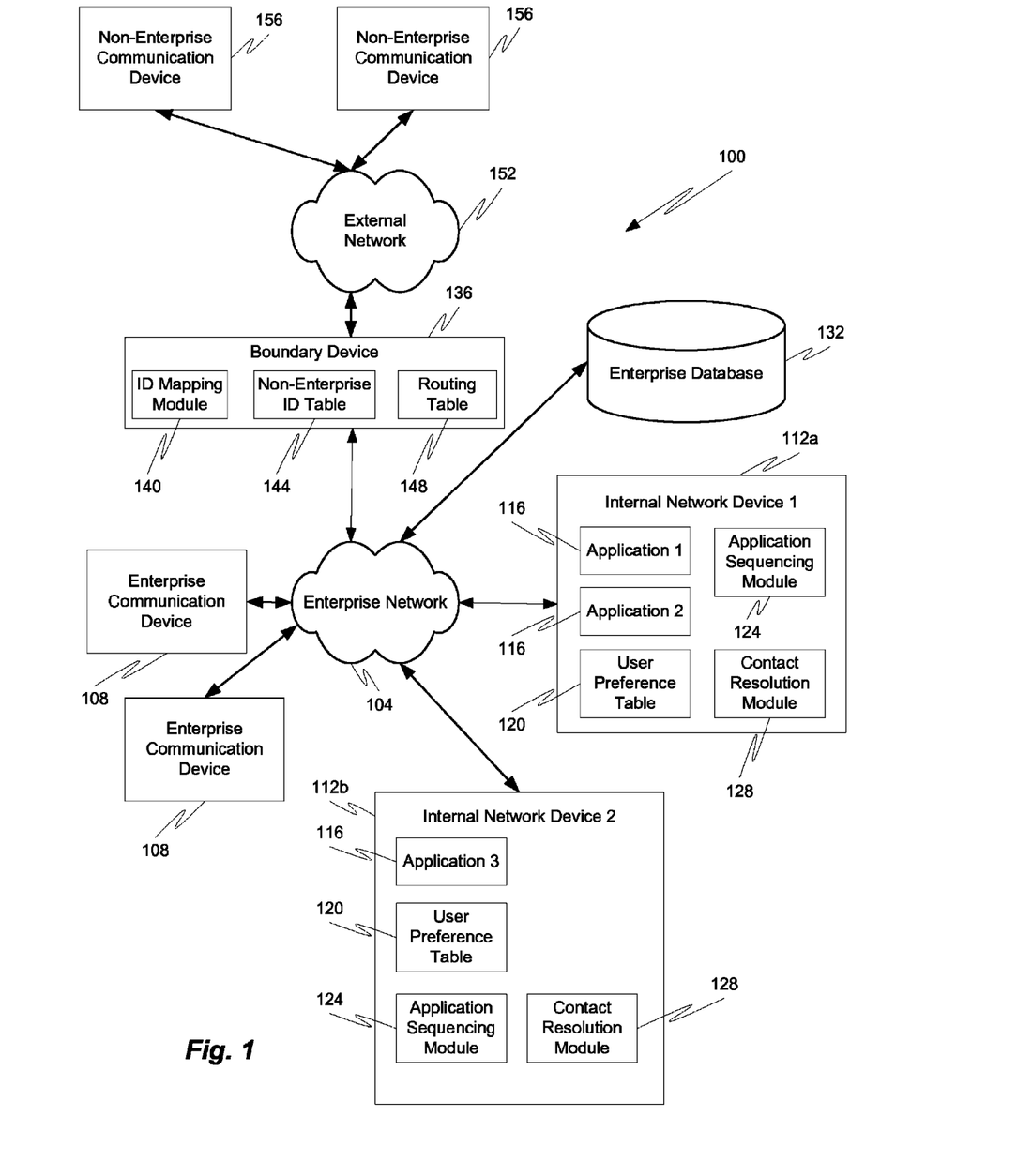
FIG. 1 is block diagram depicting a communication system in accordance with at least some embodiments of the present invention.

With reference initially to FIG. 1, an exemplary communication system 100 will be described in accordance with at least some embodiments of the present invention. More specifically, the communication system 100 includes a first network, such as an enterprise communication network 104, adapted to interconnect one or more enterprise communication devices 108 (i.e., devices owned, operated, and/or trusted by the enterprise which administers the enterprise network 104) with one or more internal network devices 112a, 112b. The internal network devices 112a, 112b may correspond to any type of application or feature server. More specifically, the internal network devices 112a, 112b may correspond to a SIP application or feature server that is adapted to provide SIP functions to one or more of the enterprise communication devices 108. More broadly, the internal network devices 112a, 112b may provide selected features and application to enterprise users, who may or may not necessarily be using an enterprise communication device 108. In addition to providing features or applications, the internal network devices 112a, 112b may also be configured to provide contact resolution functionality and/or determine application sequencing for various communication requests received at the internal network device 112a, 112b. Some examples of a suitable internal network device 112a or 112b include, without limitation, the Communication Manager, Communication Manager Branch, SIP Enablement Services, System Manager, and other similar devices produced and sold by Avaya, Inc.

The enterprise communication network 104 may be any type of known communication medium or collection of communication mediums and may use any type of protocols to transport messages between endpoints. The enterprise communication network 104 may include wired and/or wireless communication technologies. Examples of an enterprise network 104 include a Local Area Network (LAN), a Wide Area Network (WAN), a Session Initiation Protocol (SIP) network, and any other type of packet-switched or circuit-switched network known in the art. In addition, it can be appreciated that the enterprise communication network 104 need not be limited to any one network type, and instead may be comprised of a number of different networks and/or network types.

The enterprise network 104 may be connected to an external communication network 152 (e.g., a non-enterprise communication network) via one or more network boundary devices 136. One example of the network boundary device 136 is the Aura Session Manager produced and sold by Avaya, Inc. The external communication network 152 may comprise any type of non-enterprise network (e.g., any network not secured and/or administered by enterprise personnel). The Internet is an example of the untrusted communication network 152 that constitutes and IP network consisting of many computers and other communication devices located all over the world, which are connected through many telephone systems and other means. Other examples of the external communication network 152 include, without limitation, a standard Plain Old Telephone System (POTS), an Integrated Services Digital Network (ISDN), the Public Switched Telephone Network (PSTN), any type of known cellular communication network, and combinations thereof.

In accordance with at least some embodiments of the present invention, communications between enterprise communication devices 108 and non-enterprise communication devices 156 (i.e., communication devices not registered with the enterprise or communication devices not being used by a registered enterprise user) can be facilitated through the one or more network boundary devices 120. The external communication devices 156 may be similar to the internal communication devices 108 in that either device may be any type of known communication or processing device such as a personal computer, laptop, Personal Digital Assistant (PDA), cellular phone, smart phone, telephone, analog phone, DCP phone, or combinations thereof. A single communication device 108 or 156 may be controlled by or be associated with a single user or may be adapted for use by many users (e.g., an enterprise communication device that allows any enterprise user to utilize the communication device upon presentation of a valid user name and/or password).

Two or more of the communication devices 108, 156 may be associated with the same user. In other words, the communication devices 108, 156 may belong to a single user and may correspond to different types of communication devices. As one example, an enterprise user may have four enterprise communication devices 108 and/or 156 each of which correspond to a personal phone, a work phone, a personal computer, and an email retrieval device, respectively, of a single user. Thus, some of the enterprise communication devices 108 may be connected directly to the enterprise communication network 104 while other enterprise communication devices 156, such as an email retrieval device, may be connected to the external communication network 152 via a non-enterprise service provider. In accordance with at least some embodiments, however, a communication device associated with an enterprise user but not connected to the internal enterprise network 104 may be treated as an enterprise communication device 108 in that it can receive enterprise treatment for communications. Alternatively, each of the communication devices 108, 156 may be owned and operated by (e.g., associated with) a different user.

In general, the communication devices 108, 156 may be adapted to support video, audio, text, and/or data communications with other communication devices 108, 156. The type of medium used by the communication device 108, 156 to communicate with other communication devices 108, 156 may depend upon the communication applications available on the communication device 108, 156.

In accordance with at least some embodiments of the present invention, certain features of the enterprise network 104 may be made available to an enterprise user if they initiate a call or receive a call at their enterprise communication device 108 which is connected to the untrusted network 156. Such features may be provided by the internal network devices 112a, 112b based on whether or not the network boundary device 136 maps the identity of the enterprise user to a known enterprise identity.

The internal network devices 112a, 112b may be provided with one or more applications 116, a user preference table 120, an application sequencing module 124, and a contact resolution module 128 to provide one or more communication features to enterprise users. The applications 116 may be capable of providing one or more communication features to enterprise users. Exemplary applications 116 include, without limitation, an EC-500 (extension to cellular) application, a call setup application, a voicemail application, an email application, a voice application, a video application, a text application, a conferencing application, and any other type of known communication application.

The user preference table 120 may comprise communication preferences for various enterprise users of the enterprise network 104. In accordance with at least some embodiments of the present invention, a specific internal network device 112a or 112b may comprise the user preferences for only a selected subset of all enterprise users. In this configuration, the internal network device 112a or 112b having the communication preferences for a particular user may be considered an authoritative proxy or authoritative server for that user. When acting as an authoritative server or proxy, the internal network device 112a, 112b can receive a communication request, identify the users associated with the communication request, usually by the user's enterprise identity, and determine the user's communication preferences by referring to the user preference table 120.

Once a user's communication preferences have been determined by the internal network device 112a, 112b, the application sequencing module 124 is invoked to determine an application sequence that will facilitate the user's identified communication preferences. In some embodiments, the contents of the user preference table 120 may be provisioned by enterprise users via a web interface and/or an audible interface.

The internal network device 112a, 112b can then route the communication request to the appropriate application 116, whether it resides in the same device or in a different device, for processing by the application.

The contact resolution module 128 may be configured to perform contact resolution on a communication request after the communication request has been processed by the necessary applications 116. In some embodiments the contact resolution module 128 may reside on the same authoritative server or proxy. In other embodiments, the contact resolution module 128 may reside on a difference internal network device 112a, 112b than the device having a user's communication preferences. In either event, the contact resolution module 128 is a particular type of application that can determine a user's communication preferences with respect to communication alerting and alert or fail to alert the appropriate communication devices associated with a user. For instance, if an enterprise user has two different communication devices 108 associated therewith, then the contact resolution module 128 can determine whether to alert one or both of those communication devices 108 when a communication request is received for a particular user. After the contact resolution phase is complete the communication request can be forwarded to the appropriate communication devices 108 in an attempt to establish a communication session.

In accordance with at least some embodiments of the present invention, the network boundary device 136 may comprise identity mapping module 140, a non-enterprise identity table 144 and a routing table 148 that enable the network boundary device 136 to analyze a call or communication request coming into the enterprise network 104 or exiting the enterprise network 104, determine which entities within the call or communication request are to have their identities mapped to an alternate identity, and alter the call or communication request to refer to the alternate identity.

As can be appreciated by one skilled in the art, the internal network device 112a, 112b may also be adapted to analyze calls, and map identities of a caller and/or callee to an alternate identity as appropriate. Therefore, although not depicted, one or both of the internal network devices 112a, 112b may also comprise an identity mapping module 140, a non-enterprise identity table 144, and a routing table 148.

A network boundary device 136 as provided herein includes any type of device belonging to an enterprise network 104 that maintains some portion of the enterprise user records. Exemplary devices which may be considered a network boundary device 136 include, but are not limited to, SIP Routing Elements, User Relation Elements, Session Border Controllers (SBC's), gateways, and proxies. SIP Routing Elements are any device which is capable of establishing the routing and dialplan relationships between SIP sites and/or provides ingress/egress to the enterprise network 104 from/to the untrusted communication network 152. User Relation Elements include any device which is capable of binding users to devices and/or binding users to their applications. Proxies include any device which is capable of taking over call control from the communication devices and serves as a central repository for address translation (name to IP address). As can be appreciated, one or more of these components may reside on a common server or may be distributed across multiple servers.

In accordance with at least some embodiments of the present invention, the mapping of user identities within a communication request does not necessarily have to occur at the network boundary device 136. For instance, the mapping may occur "behind" the network boundary device 136 within the enterprise network 104.

The mapping of user identities is particularly helpful in providing enterprise users access to their enterprise-based communication preferences (stored in the user preference table 120) even though the enterprise user may be utilizing a non-enterprise communication device 108. In other words, once the network boundary device 136 has mapped a user's non-enterprise identity to an enterprise identity with the identity mapping module 140 for a particular communication request, that communication request can be treated as if it was originated by or targeted to an enterprise device even though that may not be the case. As the communication request traverses the network to one or more applications 116, 124, 128, there is no need for each application to map the identity of the user back to an enterprise identity. This step has already been performed at the network boundary device 136, and the identity mapping is, therefore, application agnostic and bound to the communication session rather than a particular application. In other words, all processing within the enterprise network 104 can benefit from the identity mapping which occurs at the network boundary device 136.

Additionally, although the network boundary device 136 is depicted as containing a non-enterprise identity table 144 and a routing table 148, one skilled in the art will appreciate that some or all of the information needed to populate that table may also reside in an enterprise database 132 which is accessible to the network boundary device 136. Thus, when information within one of the tables is altered or re-provisioned either by the enterprise user or by an enterprise network administrator, the data can be altered at a single point (i.e., the enterprise database 132) and the network boundary devices 136 can retrieve such updates on an as-needed basis. Alternatively, the tables 144, 148 may be maintained individually and completely within each network boundary device 136.

In accordance with at least some embodiments of the present invention, the non-enterprise identity table 144 is a user and/or administrator provisioned table that contains information mapping enterprise identities of certain enterprise users to one or more non-enterprise identities of the same user. The identity mapping module 140 is the routine which is operable to implement the necessary identity mapping which allows enterprise users to access their enterprise communication preferences without utilizing an enterprise communication device 108.

The routing table 148, on the other hand, comprises a mapping of enterprise identities to an authoritative server or proxy for the user associated with that identity. This information may be provisioned directly in the network boundary device 120, again via a web-interface or audio interface, or may be automatically populated when a user updates their information in an enterprise database 116 (e.g., the enterprise database 116 may push data updates to the network boundary device 120 or the boundary device 120 may periodically poll the enterprise database 116 for recent changes).

In other words, the routing table 148 may comprise information that identifies a user (usually via an enterprise AOR) and maps that enterprise AOR to an internal network device 112a, 112b. SIP allows an in-domain AOR to be expressed using any of three (or more) aliases. "In-domain" means that a member of any of the domains or subdomains for which the enterprise is authoritative. Each alias may refer to the same user but in a different expression or format. Assigning three AORs per user provides maximum interoperability with classic private enterprise networks, the global PSTN, and the Internet. As an example, the three AORs for the user "John Doe" might be:

3031234567@e.com—This format is called the Enterprise Private Numbering Format. The user part must be a numeric string. It does not include the "+" character but includes the @SIPdomain part. Note: customers may choose E.164 format (without a leading "+") as their private numbering plan or have no private numbering plan alias at all.

+13031234567@e.com—This format is called E.164 International Format. It includes the "+" character in the first position and the @SIPdomain part.

JohnDoe@e.com—This format is called the Alphanumeric Handle Format. It includes the @SIPdomain part and the user part must not be E.164 Internation Format or Private Numbering Format.

All three forms are considered enterprise canonical because they are core-routable and uniquely represent a single user in every location or site throughout the enterprise network 104. All of these AOR formats and the routing for them are provisioned and some or all of that provisioned information may be maintained in the routing table 148 and/or non-enterprise identity table 144.

In operation, the network boundary device 136 is adapted to receive a communication request from either an external communication network 152 or the enterprise network 104. The network boundary device 136 then invokes the identity mapping module 140 to analyze the communication request and determine one or more entities identified in the communication request, such as the originating user (i.e., caller), the target user (i.e., callee), and/or target entity (e.g., in a contact center configuration where one communication request is directed toward an enterprise rather than a particular user). The identity mapping module 140 takes this information and performs an assessment to determine whether one or more entities identified in the communication request have an alternate identity (e.g., an enterprise identity for a user identified via a non-enterprise identity in the communication request or a non-enterprise identity for a user identified via an enterprise identity in the communication request). The assessment may include a comparison against information stored in the non-enterprise identity table 144, the routing table 148, or any other provisioned policy or rules. Based on this determination the identity mapping module 140 then alters one or more headers in the communication request with an alternate identifier that will follow the communication request throughout the enterprise network 104 or the untrusted communication network 152.

Figure 2:
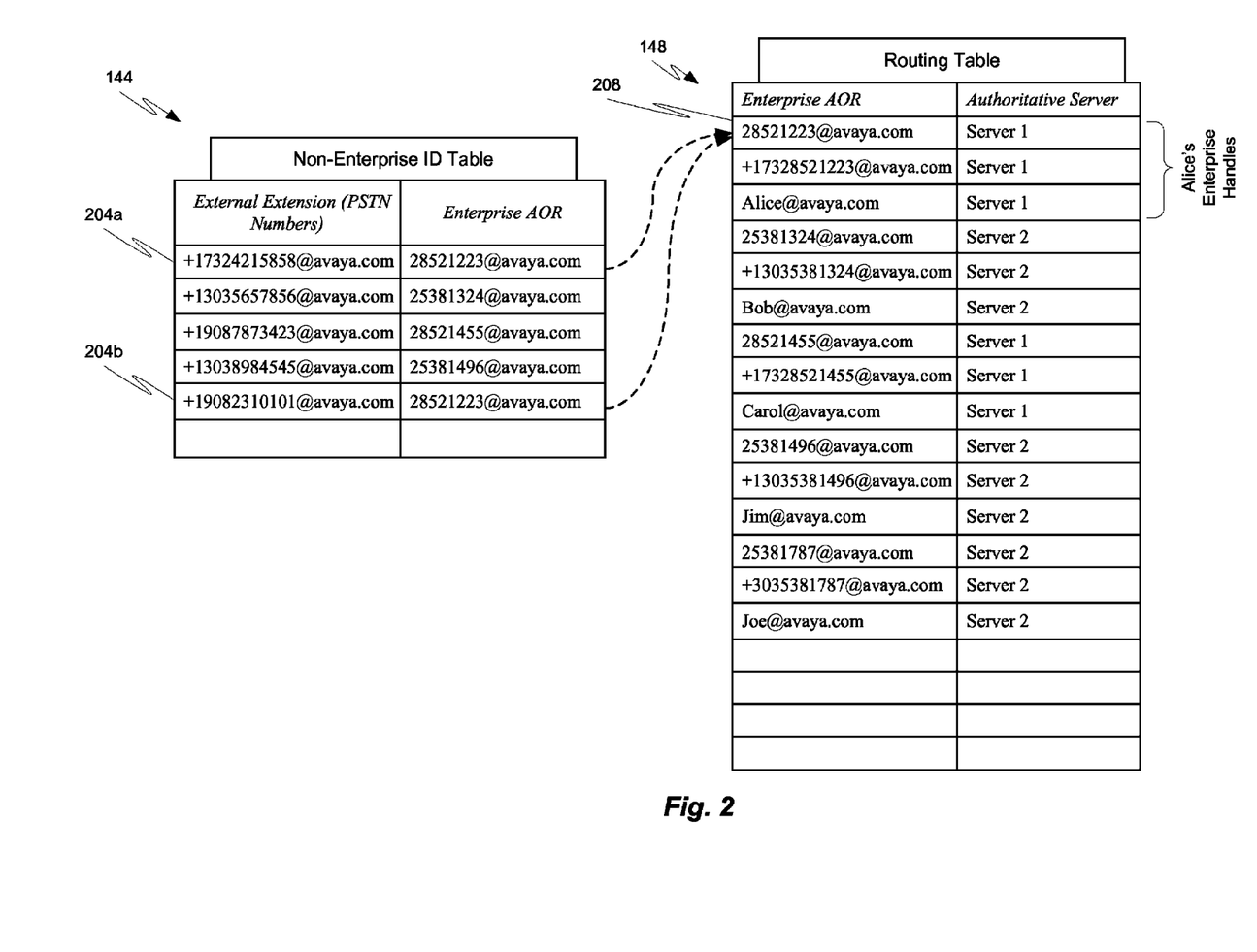
FIG. 2 is a block diagram depicting an exemplary set of data structures used to map a first user identity to a second user identity in accordance with at least some embodiments of the present invention.

With reference now to FIG. 2, an exemplary set of data structures used for mapping identities will be described in accordance with at least some embodiments of the present invention. More specifically, details of the non-enterprise identity table 144 and routing table 148 will be described in accordance with at least some embodiments of the present invention.

The non-enterprise identity table 144 may comprise one or more fields to facilitate the mapping of non-enterprise identities to enterprise identities and vice versa. In some embodiments, the non-enterprise identity table 144 comprises a non-enterprise identity field and an enterprise identity field which is populated with the various entity/non-entity associations for enterprise users. In some embodiments, the non-enterprise identity table 144 at a given network boundary device 136 may comprise entries for all enterprise users, or at least those that have a mapping between enterprise and non-enterprise identities. In other embodiments, the non-enterprise identity table 144 at a given network boundary device 136 may comprise entries for only a subset of all enterprise users.

The routing table 148 may also comprise one or more fields to facilitate the mapping of enterprise user to an authoritative server. In some embodiments, the routing table 148 comprises an enterprise identity field and an authoritative server field. Each row in the routing table 148 maps a particular enterprise identity for an enterprise user to that user's authoritative server. As can be appreciated by one skilled in the art, since an enterprise identity (e.g., an in-domain AOR) may have multiple aliases, each alias for a user may be mapped to the same authoritative server.

As can be seen in FIG. 2, a particular user, Alice, may have multiple non-enterprise identities 204a, 204b, each of which may be associated with different communication devices (e.g., a personal home phone and a personal cellular phone). All of a user's non-enterprise identities 204a, 204b may be mapped to the same enterprise identity 208, which is then referenced in the routing table 148 to identify an authoritative server for that user.

In accordance with at least some embodiments, the identity mapping module 140 may be configured to receive a communication request and replace a first identity of a user in the header of the communication request with a second identity of the user. The enterprise and non-enterprise identities for a user in the non-enterprise identity table 144 may comprise those alternate identities which can be swapped by the identity mapping module 140, depending upon whether the communication request is inbound to or outbound from the enterprise network 104.

Figure 3:
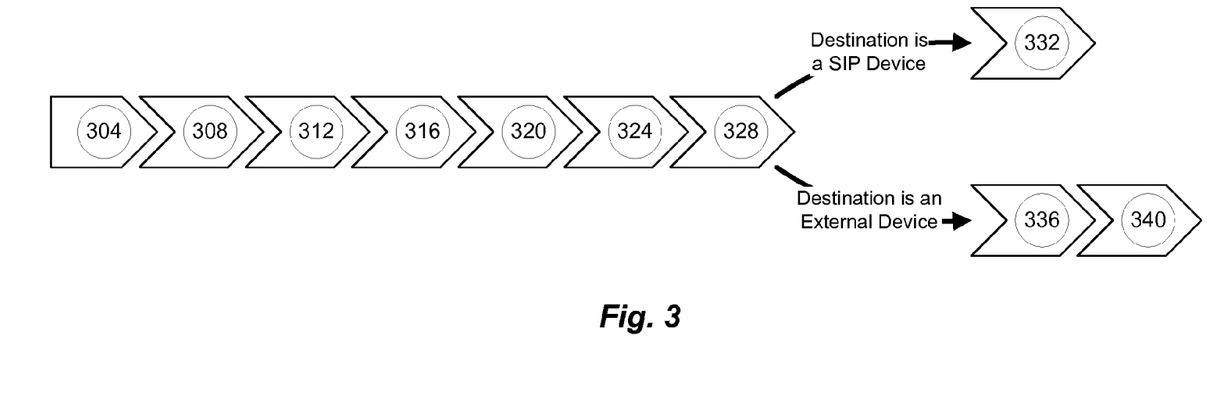
FIG. 3 is a diagram depicting an outbound request processing flow in accordance with at least some embodiments of the present invention.

Referring now to FIG. 3, an exemplary outbound request processing flow diagram will be described in accordance with at least some embodiments of the present invention. This particular flow diagram reflects steps taken for an outbound communication request from the enterprise network 104 to the untrusted communication network 152. The flow begins when a communication request is initiated by an enterprise communication device 108 (step 304). Thereafter, a user authorization is performed, if such a step is required by the enterprise (step 308).

The communication request then undergoes origination-side processing where the authoritative server of the calling party determines an appropriate application sequence based on the calling party's communication preferences (step 312). This application sequence is determined by referencing the calling party's enterprise identity within the user preference table 120 and determining an application sequence to match the calling party's preferences.

The flow continues when the communication request is received at the network boundary device 136, where the identity mapping module 140 is invoked to determine whether the called party is in the non-enterprise identity table 144 (step 316). If no match is found in the non-enterprise identity table 144 for the called party, then the communication request continues to the untrusted communication network 152. If, however, a match is found in the non-enterprise identity table 144, the contents of the Request URI (i.e., non-enterprise identity of the called party in the destination-side header) are replaced with the enterprise identity of the called party found in the non-enterprise identity table 144. Additionally, a supplemental parameter may be added to the header identifying that the destination device is an external device (i.e., a non-enterprise communication device). Additional details of adding this particular data to the communication request are described in U.S. patent application Ser. No. 12/493,031, filed Jun. 26, 2009, the entire contents of which are hereby incorporated herein by reference.

Moreover, the original identifier (i.e., the non-enterprise identity) of the called party may be maintained in the communication request by having its value inserted in a header where it can be retrieved at a later point in the call processing.

Thereafter, the phase of the call may be changed to terminal-side processing and the communication request may be routed to an authoritative server of the called party, as determined by referencing the routing table 148 (step 320). Once the communication request is received at the authoritative server of the called party, actual terminal-side processing begins such that the application sequencing module 124 of the authoritative server determines the appropriate application sequence for terminal-side processing of the communication request based on communication preferences of the called party (step 324).

Following terminal-side processing, the phase of the communication request may again be altered to a contact resolution phase and contact resolution may be performed for all contact addresses (step 328). In this step, the value in the Request URI may be replaced with the contact addresses and the phase of the communication request may be altered to endpoint. The communication request is then forwarded to the appropriate device(s). In the event that one of the destination devices is an enterprise communication device 108 internal to the enterprise network 104, then routing logic forward the request to the contact address (step 332). If, on the other hand, one of the destination devices is a non-enterprise communication device 156, then the communication request is routed to an appropriate gateway/SIP trunk (step 336) such that the communication request can be routed to the desired external number (step 340). In some embodiments, since the tag phase has been altered to endpoint for the communication request, the routing logic may be allowed to bypass non-enterprise extensions and other table lookups which would usually be needed during call routing. Furthermore, since the communication request is leaving the enterprise network 104, it may be beneficial or necessary to replace the value in the Request URI with the original identity of the called party.

Figure 4:
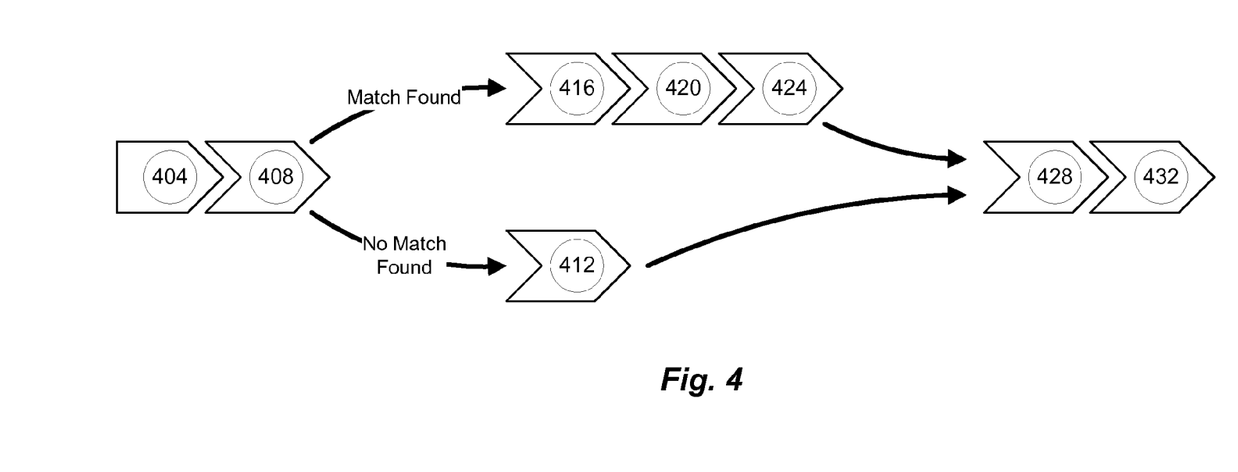
FIG. 4 is a diagram depicting an inbound request processing flow in accordance with at least some embodiments of the present invention.

Referring now to FIG. 4, an exemplary inbound request processing flow diagram will be described in accordance with at least some embodiments of the present invention. This particular flow diagram reflects steps taken for an inbound communication request from the untrusted network 152 received at the enterprise network 104. The flow begins with the origination of the communication request is some part of the untrusted communication network 152 (i.e., by a non-enterprise communication device 156) (step 404). The incoming request is received at a gateway, SIP trunk, or similar type of network boundary device 136 (step 408). Initially, the communication request does not have a phase associated therewith. Upon receiving the request, the network boundary device 136 invokes the identity mapping module 140 to look up the originator (caller or calling party) of the communication request as identified in the PAI header, From header, or some other agreed upon header, of the request in the non-enterprise identifier table 144.

If no match for the originator's identifier is found in the non-enterprise identity table 144, the flow continues by looking up the target (callee or called party) of the communication request as identified in the R-URI header, To header, or some other agreed upon header in the routing table 148 to determine an authoritative server for the called party (step 412). Again, the details of the PAI header and Request URI are described in U.S. patent application Ser. No. 12/493,031.

The communication request is then forwarded by the network boundary device 136 to the authoritative server for the called party where an application sequence is determined for the called party (step 428). This invokes terminal processing of the communication request, which involves passing the communication request to the applications 116 identified in the application sequence, such that those applications 116 can process the communication request. Thereafter, contact resolution is performed, possibly by the authoritative server, and the communication request is forwarded to the appropriate communication device(s) associated with the called party (step 432).

Referring back to step 408, if a match was found for the calling party in the non-enterprise identity table 144, then the flow continues by mapping the original identity of the calling party to an enterprise identity of the calling party (step 416). During this step, the enterprise AOR of the originator replaces the original non-enterprise identity of the originator in the PAI header of the communication request. Additionally, the communication request may be marked with some indicator, such as device-type=external, to identify that the communication request originated from a non-enterprise communication device 156. Furthermore, the original identity of the called party may be inserted as a parameter in the communication request, possibly in one or more headers of the communication request. The authoritative server for the calling party is then determined by referencing the routing table 148.

Then a phase of the call is altered to reflect that origination processing is beginning and the request is forwarded to the authoritative server (step 420). The authoritative server determines an application sequence based on communication preferences of the calling party and routes the communication request to a first application in the sequence to invoke the application sequence. As can be appreciated by one skilled in the art, any of the above-discussed application sequences can include invoking one or more applications. When a first application has completed processing a communication request that first application can then forward the communication request to a second application (as identified in the application sequence) to continue the processing of the communication request and complete the application sequence.

After applications for the originator's application sequence have been invoked, the method continues by routing the communication request to the authoritative server of the called party (step 424). As can be appreciated by one skilled in the art, the authoritative server for both the calling party and called party can be determined in the same step by the network boundary device 136 or in separate steps. The authoritative server of the called party may be the same as or different from the authoritative server of the calling party. Generally speaking, it may be more efficient to determine authoritative servers for both the calling party and called party at a single device (i.e., the network boundary device 136) rather than doing such a determination in two different steps, because the same routing table 148 can be referenced for the calling party and the called party. Thereafter, terminal processing of the communication request begins (step 428).

FIGS. 3 and 4 were used to discuss communication situations where a communication request naturally traversed an enterprise network 104 boundary either because the communication request was originated by an enterprise communication device 108 and was directed toward a non-enterprise communication device 156 or because the communication request was originated by a non-enterprise communication device 156 and was directed toward an enterprise communication device 108. In these situations, the communication request encountered the network boundary device 136 due to the inherent nature of the communication.

As can be appreciated by one skilled in the art, communication requests may also originated at one enterprise communication device 108 which are directed to another enterprise communication device 108. These types of communications are referred to as internal communications as they generally occur between two identified enterprise users. The operation of an internal call between two enterprise users where both users have bound their enterprise AOR's to one or more external numbers will now be discussed in accordance with at least some embodiments of the present invention.

When a user with the shared line appearance (with an external number) initiates a request to another enterprise user, the request goes through the calling user's authoritative server. The originating-side authoritative server (i.e., calling party's authoritative server) invokes the sequence of originating applications 116 associated with the calling party, where one of the applications 116 is responsible for implementing shared line appearance. At this stage, the call is not extended to the external number, but the enterprise device has the option to extend it.

At the terminal-side, the authoritative server of the called party initiates the sequence of applications associated with the called party. As the called party also has the shared line appearance feature, one of the applications 116 in the terminal sequence is responsible for this logic.

To offer the call to different contacts of the called party including external numbers, the application 116 may leverage contact resolution logic to fork the call by forwarding the request to the contact resolution module 128 (without modifying the R-URI). Alternatively, the application may fork the call itself by replacing the R-URI with different contact addresses.

A few call scenarios involving two enterprise users will now be discussed in accordance with at least some embodiments of the present invention. Both the users have enterprise numbers (i.e., enterprise identities) as well as associated external numbers (i.e., non-enterprise identities). Following are two call examples:

1. An enterprise user calls another user by dialing PSTN extension of the called user from enterprise phone; and
2. An enterprise user calls another user by dialing the enterprise number from his/her PSTN extension of the enterprise phone.

In these examples it can be assumed that the two enterprise users are Alice and Bob. They have enterprise ids 28521223@avaya.com (call it Alice-e) and 25381324@avaya.com (call it Bob-e) respectively. In addition, both of them have extended their enterprise features to their external numbers. Alice has mobile number +17324215858 (call it Alice-m) and Bob has mobile number +13035657856 (call it Bob-m) as their respective PSTN extensions.

While in the first scenario Alice calls Bob's mobile number from her enterprise phone, in the second scenario, Alice calls Bob's office number from her mobile phone. In the first scenario, as Alice-e initiates a call to Bob-m, the communication request goes through Alice's authoritative server. As it is a call origination, the authoritative server invokes origination applications associated with Alice's communication preferences. After all the origination side applications are invoked, the authoritative server changes the phase of the call to terminating. To determine the next authoritative server, Alice's authoritative server passes the communication request to a boundary device 136, which invokes the identity mapping module 140 to look up the called party (Bob-m) in the non-enterprise identity table 144. Alternatively, Alice's authoritative server could comprise an identity mapping module 140 which is capable of performing the table 144 lookup.

As Bob-m is associated with Bob-e, an entry is found in the non-enterprise identity table 144. Using Bob-e, another lookup is performed in the routing table 148 to determine the authoritative server for Bob. Before forwarding the request to Bob's authoritative server, the communication request is updated to reflect the special nature of the call.

At Bob's authoritative server, terminal applications 116 associated with Bob's communication profile (as determined in the user preference table 120) are invoked. As one of the applications 116 is responsible for shared line appearance feature, it may fork requests to multiple devices that Bob has registered with (like Bob-e and Bob-m). This application 116 learns of Bob's multiple contact addresses by registering to a registration event package or similar registration-aware application. Alternatively, the application 116 may rely on the contact resolution module 128 of Bob's authoritative server to fork the request. If the application 116 wishes the authoritative server to fork the request, it does not change the R-URI. After invoking all of the terminal side applications, Bob's authoritative server performs contact resolution. For SIP device (Bob-e), it forwards the request to the registered address. For external device (Bob-m), it hands over the call to the network boundary device 136 to deliver to appropriate external gateway/SIP trunk.

In the second scenario, Alice initiates a call from her mobile phone (Alice-m) to Bob's enterprise AOR (Bob-e). The call request traverses through the mobile network to the network boundary device 136 connecting the enterprise network 104 with the untrusted communication network 152. The network boundary device 136 receives the request and invokes the identity mapping module 140. As the request has arrived without any phase tag, the caller id (Alice-m) is checked against the non-enterprise identity table 144. As an association is found (to Alice-e), another lookup is performed in the routing table 148 to locate Alice's authoritative server. Before forwarding the request to Alice's authoritative server, a phase tag is inserted in the request to request the origination processing of the call. In addition, the communication request is updated to reflect the special nature of the call.

At Alice's authoritative server, origination-side applications associated with Alice, as determined by the user preference table 120, are invoked. As one of the applications 116 is shared line appearance, that application 116 sends notifications to other registered contacts. This is to allow Alice to join this call from other devices (such as Alice-e). After all the origination side applications are invoked, Alice's authoritative server changes the phase of the call to terminating. To determine the next authoritative server, the communication request is passed to the network boundary device 136 where the identity mapping module 140 is invoked to look up the called party (Bob-e) in the non-enterprise identity table 144. Alternatively, Alice's authoritative server may perform a lookup in the non-enterprise identity table 144.

As Bob-e is not found in this table, a second lookup is performed in the routing table 148 to determine the authoritative server of Bob-e. As Bob-e is an enterprise user, this lookup returns the address of Bob's authoritative server. Before forwarding the request to the Bob's authoritative server, a phase tag is inserted in the request to request the terminal processing of the communication request.

At Bob's authoritative server, terminal applications associated with Bob's profile, as determined from the user preference table 120, are invoked. As Bob also has multiple contacts (internal and external), the request is forked to terminate at the enterprise SIP device (Bob-e) and external mobile device (Bob-m). Depending upon the logic and application policy, one of the devices (usually the first device to answer) stays in the call while the other request is dropped.

The communication scenarios discussed so far have been generally related to communications that either naturally traverse the boundary of the enterprise network 104 (e.g., calls coming into or leaving the enterprise network 104) or traverse the boundary of the enterprise network 104 due to a shared line appearance. Embodiments of the present invention may also be utilized in circumstances where a first enterprise user calls a second user (not necessarily an enterprise user) from a non-enterprise communication device 156. This may require that the enterprise user configure their non-enterprise communication device 156 to operate in an "enterprise mode" rather than a normal mode whereby communication requests are sent directly to the dialed number. In the enterprise mode, the non-enterprise communication device 156 may be adapted to generate a communication request with the dialed number, but send the communication request to the enterprise network 104 for origination-side processing. This enables the network boundary device 136 to receive the communication request and process it as described above. Once origination-side processing is completed, the communication request may be sent to the network boundary device 136 such that it can be routed to the dialed number. If the called party does not have an enterprise identity, then the communication request may be forwarded directly to the called party through the untrusted communication network 152. If, however, the called party does have an enterprise identity, then the network boundary device 136 may invoke the identity mapping module 140 as described above and terminal-side processing of the communication request can occur in the enterprise network 104.

In accordance with at least some embodiments of the present invention, it may be possible to map one network type to another network type. In particular, it may be possible to includes some sort of network type identifier in the caller identification field. Instead of simply mapping an external identity to an enterprise identity and possibly back to the same external identity, embodiments of the present invention may be leveraged to map a first external identity to an enterprise identity and then map the enterprise identity to a second external identity that is different from the first external identity. This may allow the calling party or called party to access and leverage multiple external identities from within the enterprise network.

While most details have been described in connection with calls, embodiments of the present invention are not so limited. For example, embodiments of the present invention can be used on any SIP request including, without limitation, presence requests, instant messaging, and other communication services.

Additionally, while embodiments of the present invention have been described in connection with using an assessment algorithm possibly including a table look-up, one skilled in the art will appreciate that embodiments of the invention are not so limited. More specifically, embodiments of the present invention relate to the fact that identities of calls or requests are altered and not specifically how the device decided to create and apply the alteration. Any decision algorithm can be used to determine if an entity's identity should be altered without departing from the sprit of the present invention.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for mapping user identities across network boundaries. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   receiving, by at least one processor, a communication request at a network device of a first network, wherein the first network comprises an enterprise network;
   determining, by the at least one processor, a first identity of a first user identified in the communication request, wherein the first identity comprises a non-enterprise identity;
   mapping, by the at least one processor, the first identity of the first user to a second identity of the first user, wherein the second identity comprises an enterprise identity and wherein mapping comprises altering the communication request to identify the first user by the second identity;
   forwarding an altered communication request to a first internal network device of the first network, wherein the altered communication request comprises the second identity in a header and further maintains the first identity in a non-header portion of the communication request;
   after the communication request has been processed by the first network, receiving the altered communication request at a network boundary device of the first network;
   replacing, at the network boundary device, the second identity with the first identity in the header; and
   forwarding the altered communication request having the first identity in the header to a device outside of the first network.

2. The method of claim 1, wherein at least one of the determining and mapping occur at the network device, wherein a non-enterprise identification table is used in connection with the mapping of the first identity to the second identity, and wherein the non-enterprise identification table is available to a network boundary device.

3. The method of claim 2, wherein the non-enterprise identification table is populated by provisioning and the non-enterprise identification table maps enterprise identies to non-enterprise identities for users trusted within the first network.

4. The method of claim 3, wherein a routing table is used in connection with the forwarding step, wherein the routing table maps enterprise identities of a user to an authoritative server for the user, and wherein the authoritative server comprises the first internal network device.

5. The method of claim 1, wherein as a part of altering the communication request, at least one value in a header of the communication request is altered to reference the second identity instead of the first identity.

6. The method of claim 5, wherein the header comprises at least one of a destination side header, a caller side header, and a contact header.

7. The method of claim 6, wherein the first user is at least one of an originator and target of the communication request and wherein the second identity is an enterprise identity of the at least one of the originator and target.

8. The method of claim 1, wherein the first internal network device comprises an application sequencing module which is configured to determine an application sequence for the communication request based on the second identity and forward the communication request to a first application in the determined application sequence for processing by the first application.

9. The method of claim 8, wherein the first application is configured to refer to the second identity in connection with processing the communication request and forward the communication request to a second application in the determined application sequence, wherein the second application is also configured to refer to the second identity in connection with processing the communication request.

10. The method of claim 1, the method further comprising: forwarding the altered communication request to a device outside of the first network.

11. A non-transitory computer readable medium encoded with processor executable instructions configured to, when executed, perform the method of claim 1.

12. A communication system, comprising:
a first network having a first network boundary device, wherein the first network comprises an enterprise network, the first network boundary device residing between the first network and a second network, the first network boundary device configured to receive a communication request, determine a first identity of a first user identified in the communication request, wherein the first identity comprises a non-enterprise identity, forward an altered communication request to a first internal network device of the first network, and map the first identity of the first user to a second identity of the first user, wherein the second identity comprises an enterprise identity, wherein mapping comprises altering the communication request to identify the first user by the second identity, wherein the altered communication request comprises the second identity in a header and further maintains the first identity in a non-header portion of the communication request; and
a second network boundary device configured to, after the communication request has been processed by the first network, receive the altered communication request, replace the second identity with the first identity in the header, and forward the altered communication request having the first identity in the header to a device outside of the first network.

13. The system of claim 12, wherein as a part of altering the communication request, at least one value in a header of the communication request is altered to reference the second identity instead of the first identity and wherein the header comprises at least one of a destination side header, a caller side header, and a contact header.

14. The system of claim 12, wherein the first user is at least one of an originator and target of the communication request and wherein the second identity is an enterprise identity of the at least one of the originator and target.

15. The system of claim 12, wherein the first internal network device comprises an application sequencing module which is configured to determine an application sequence for the communication request based on the second identity and forward the communication request to a first application in the determined application sequence for processing by the first application.

16. The system of claim 15, wherein the first application is configured to refer to the second identity in connection with processing the communication request and forward the communication request to a second application in the determined application sequence, wherein the second application is also configured to refer to the second identity in connection with processing the communication request.

17. The system of claim 12, wherein the first identity comprises an enterprise identity, wherein the second identity comprises a non-enterprise identity, wherein the first network comprises an enterprise network, and wherein the first network boundary device is further configured to forward the altered communication request to a device outside of the first network and also provide at least one of a network type and a third identity, which is different from the first and second identities, in the communication request.

\* \* \* \* \*